United States Patent [19]
Joulie et al.

[11] Patent Number: 5,594,827
[45] Date of Patent: Jan. 14, 1997

[54] ELECTRICAL INSULATOR EQUIPPED WITH OPTICAL FIBERS, AND MANFACTURING METHOD THEREFOR

[75] Inventors: René Joulie, Bellerives/Allier; Gilles Bourdier, Beaumont les Randan, both of France

[73] Assignee: SEDIVER Societe Europeenne d'Isolateurs en Verre et Composite, Nanterre Cedex, France

[21] Appl. No.: 536,476

[22] Filed: Sep. 29, 1995

[30] Foreign Application Priority Data

Sep. 30, 1994 [FR] France ................................. 94 11726

[51] Int. Cl.$^6$ ........................................................ G02B 6/44
[52] U.S. Cl. ...................... 385/101; 174/80; 174/139; 174/167; 385/134
[58] Field of Search ........................... 385/100, 101, 385/104, 111, 134, 138, 139; 174/30, 40 R, 41, 44, 70 R, 74 R, 74 A, 80, 139, 167

[56] References Cited

U.S. PATENT DOCUMENTS

| 4,610,033 | 9/1986 | Fox, Jr. ................... 174/139 X |
| 4,613,727 | 9/1986 | Salanki et al. ............... 174/30 |
| 4,717,237 | 1/1988 | Austin ...................... 385/101 |
| 4,772,090 | 9/1988 | Atkins et al. ................ 385/101 |
| 4,802,731 | 2/1989 | Maschek et al. .............. 385/101 |
| 4,827,081 | 5/1989 | Seabourne et al. ............ 174/139 |
| 4,921,322 | 5/1990 | Seike et al. ................ 385/138 |
| 5,136,680 | 8/1992 | Seike et al. ................ 385/139 |

FOREIGN PATENT DOCUMENTS

| 0182575A3 | 5/1986 | European Pat. Off. . |
| 89149726 | 4/1990 | Germany . |
| 4227410C1 | 11/1993 | Germany . |

OTHER PUBLICATIONS

*Patent Abstracts of Japan*, vol. 010 No. 089 (P–444), 8 Apr. 1986 & JP–A–60 225806 (Fujikura Densen KK) 11 Nov. 1985.

*Patent Abstracts of Japan*, vol. 010, No. 143 (P–459), 27 May 1986 & JP–A–60 262103 (Tokyo Denryoku KK; Others: 02) 25 Dec. 1985).

*Primary Examiner*—John D. Lee
*Attorney, Agent, or Firm*—Sughrue, Mion, Zinn, Macpeak & Seas

[57] ABSTRACT

The electrical insulator includes a laminated tube serving as a support for a covering of elastomer material constituting a plurality of annular fins which project from the tube. Two circular grooves and a helical groove are formed in the outside wall of the tube for receiving the optical waveguide. The circular grooves are parts of bearing surfaces which are formed at the ends of the tube and to which end fittings of the insulator are secured. The optical waveguide is embedded in the elastomer material and at the bottoms of the grooves.

7 Claims, 2 Drawing Sheets

ELECTRICAL INSULATOR EQUIPPED WITH OPTICAL FIBERS, AND MANFACTURING METHOD THEREFOR

The invention relates to an electrical insulator including a support element having an outside wall extending along a longitudinal axis between two ends, two end fittings secured to respective ends of the support element on bearing surfaces formed in the outside wall thereof, and an optical waveguide installed inside the insulator so as to extend from one end of said insulator to the other end thereof, and so as to pass through the two end fittings.

BACKGROUND OF THE INVENTION

An electrical insulator of the above-indicated type is designed in particular to serve as an insulating support member for an outdoors high-voltage installation, as described in U.S. Pat. No. 4802731.

That document discloses a first disposition in which the optical waveguide is installed along a linear or even helical path in the inside volume of the support element which is constituted by a laminated tube. Unfortunately, the inside volume of the tube is, in general, filled with a pressurized dielectric gas, such as $SF_6$, so as to prevent electrical arcs from striking between the high-potential end of the insulator and the low-potential end of the insulator. As a result, that disposition for the optical waveguide involves gastightness problems because the optical waveguide must pass from the inside volume of the tube to the outside of the tube.

The above-mentioned document also discloses a disposition in which the optical waveguide is embedded in the thickness of the laminated tube. Actually, it is proposed to combine filament winding as performed in manufacturing the laminated tube with winding the optical waveguide. In practice, such a method is very difficult to implement, in particular because the optical waveguide is subjected both to mechanical stresses and to thermal stresses when the tube is heated after the filament winding step. Furthermore, it is difficult to hold one end of the optical waveguide while it is being wound, and to control the go-and-return winding of the filament while simultaneously controlling winding of the optical waveguide. In addition, the ends of the tube have to be cut off, which is difficult when the optical waveguide is present.

The above-mentioned document also proposes to embed the optical waveguide in the elastomer material that covers the laminated tube and that constitutes the insulating fins. But such a method is also very difficult to implement when the fins of the insulator are constituted by a continuous strip of elastomer material that is obtained by extrusion and that is helically wound around the tube. Moreover, that method requires the pitch at which the optical waveguide is wound around the tube to be identical to the pitch at which the extruded continuous strip constituting the fins is wound. It is necessary to be able to vary the length of the waveguide between the two ends of the tube independently from the number of fins in order to adapt the acceptable voltage gradient that is established in the optical waveguide.

OBJECTS AND SUMMARY OF THE INVENTION

An object of the invention is to provide both an electrical insulator which does not suffer from the above-indicated drawbacks, and which is simple to implement, and also a method of manufacturing such an insulator.

According to the invention, the optical waveguide extends along the bottoms of a helical groove and of two circular grooves extending about the longitudinal axis of the support element, e.g. a laminated tube. The grooves are formed in the outside wall of the support element. Each circular groove extends a respective one of the ends of the helical groove and is a part of a bearing surface to which the corresponding end fitting is secured. The optical waveguide is embedded in the elastomer material that fills the grooves. In order to manufacture the insulator, the support element is machined so as to form the end-fitting receiving bearing surfaces which also define the circular grooves. Once the end fittings having been secured to it, the support element is machined so as to form a helical groove. A continuous strip of elastomer material is then installed in the grooves. The optical waveguide is then deposited on the top of and along said continuous strip. Finally, pressure is exerted on the top of the continuous strip so as to embed the optical waveguide in the elastomer material at the bottoms of the grooves.

This disposition ensures that the waveguide is positioned stably. It is possible to install an optical waveguide made up of a large number of optical fibers.

BRIEF DESCRIPTION OF THE DRAWINGS

An embodiment of the invention is described below with reference to the accompanying drawings, in which.

MORE DETAILED DESCRIPTION

Figure 1:
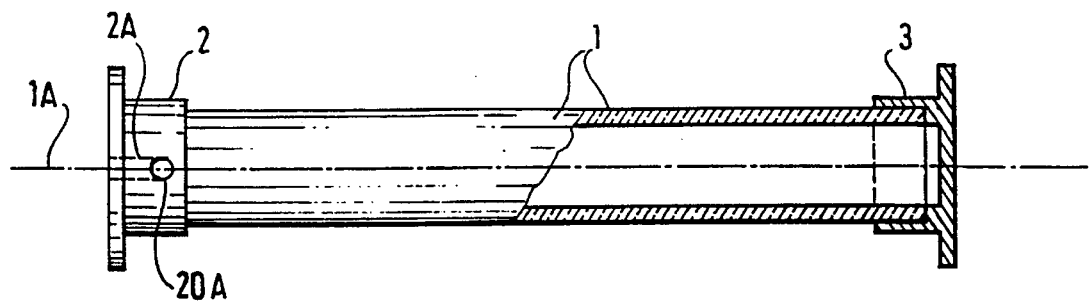
FIG. 1 is a diagrammatic view partially in section of a laminated tube equipped with a pair of end fittings and constituting a portion of an electrical insulator.
Figure 7:
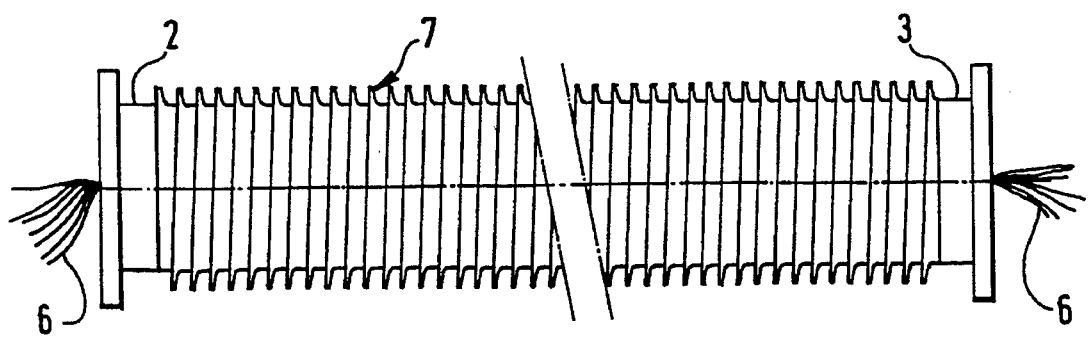
FIG. 7 is a diagrammatic view of the electrical insulator shown provided with its fin-forming final covering of elastomer material.

The electrical insulator shown in FIG. 7 includes a laminated tube 1 that is shown in FIG. 1. The laminated tube 1 is obtained by winding organic or inorganic filaments or fibers, such as glass fibers, around a former (not shown).

The filaments or fibers are bonded together in successive layers by means of a settable synthetic resin. The tube 1 may be cylindrical, as shown in FIG. 1, or it may be in the form of one or two truncated cones, or else it may have some other shape.

While still on the former, the laminated tube 1 is placed inside an oven so as to polymerize the synthetic resin. The resulting assembly is then removed from the oven, and the ends of the laminated tube 1 are cut off so as to obtain the desired axial length for the tube. Said desired length is a few meters when the electrical insulator serves as a fixed support for a high-voltage installation. It should be noted that, in particular when the tube is cylindrical, and while it is still on the former, said laminated tube 1 may be cut up at several places so as to obtain a plurality of laminated tubes, each of desired axial length.

The former is then removed from the laminated tube 1 (or from the laminated tubes obtained by cutting up the tube and the former as indicated above).

An end fitting 2, 3 is fitted at each end of the tube, and it is secured to a bearing surface of the tube by means of an adhesive agent. Each cylindrical bearing surface is obtained by machining the outside end surface the tube. It should be noted that each end fitting has a respective passage 2A, 3A in its wall, the passages being represented diagrammatically in the FIGURES, and extending substantially parallel to the axis 1A when the end fittings are fitted on the tube. It is to be understood that each passage opens out to the outside of the tube only.

Figure 2:
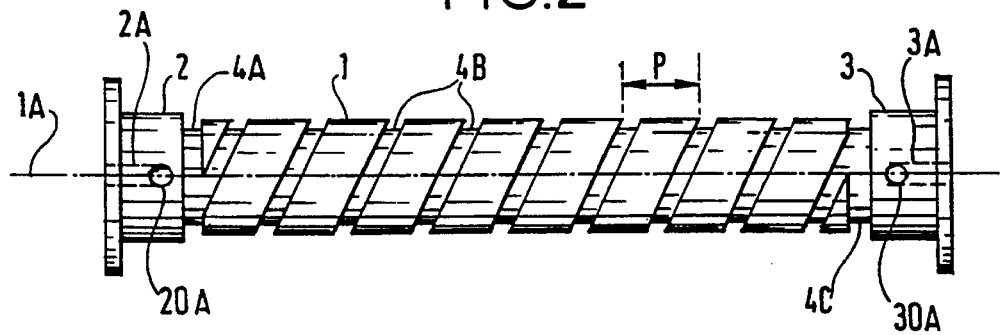
FIG. 2 is a diagrammatic view of the tube shown in FIG. 1, with the tube having been provided with a helical groove for receiving an optical waveguide.

The laminated tube 1 equipped with the two end fittings 2 and 3 is mounted on a lathe (not shown), the end fittings being clamped in the jaws of the lathe. The tube is milled so as to form a groove 4B in the wall of the tube, which groove winds helically around the longitudinal axis 1A of the tube. The ends of the groove 4B are aligned, along the axis 1A, with the openings 20A and 30A of the passages 2A and 3A in the end fittings (the openings being located closer to the middle of the tube in FIG. 2), alignment being obtained easily by adjusting the (constant or variable) winding pitch of the groove 4B. It should be noted that the helical groove 4B is advantageously extended at both of its ends by respective circular grooves 4A and 4B, each of which is provided in the vicinity of the "inner" edge of the respective end fitting, i.e. its edge which is closer to the middle of the tube. This disposition makes it possible to avoid having to adjust the winding pitch P of the groove 4B regardless of the relative position of the passages in the end fittings. The laminated tube 1 provided with the grooves 4A, 4B, and 4C is shown in FIG. 2. It should also be noted that the grooves 4A, 4B, and 4C are provided in the "cylindrical" outside surface of the laminated tube. Each circular groove 4A, 4B is part of the bearing surface on which the respective end fitting is fitted, the bearing surface having been machined before the end fittings are secured to the tube, as indicated above, which simplifies manufacture of the electrical insulator.

It is to be understood that the thickness of the wall of the laminated tube is designed to withstand the required mechanical stresses even in the presence of the grooves 4A to 4C. Furthermore, the grooves 4A to 4C must be deep enough to receive an optical waveguide such as a bundle of optical fibers 6, as described below.

Figure 3:
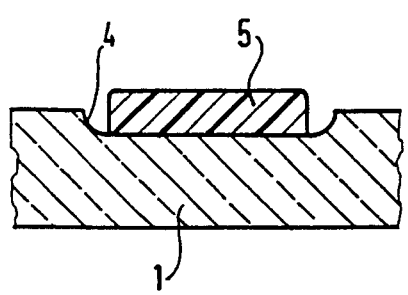
FIG. 3 is a diagrammatic view in axial section through a portion of the tube shown in FIG. 2, showing the first strip of elastomer material deposited in the groove.

Once the groove 4B has been formed, a strip 5 of elastomer material, having a cross-section that is complementary to the cross-section of each groove 4A, 4B, 4C is deposited in and along the groove(s) 4A, 4B, 4C, by extrusion and while winding helically, as shown in FIG. 3.

Figure 4:
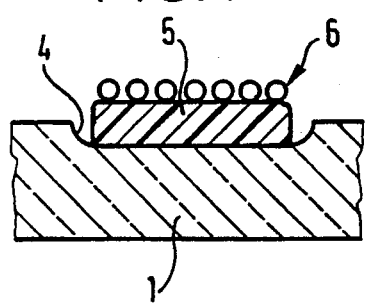
FIG. 4 is a diagrammatic view of the portion of tube shown in FIG. 3, showing the optical waveguide deposited on the first strip of elastomer material.

A bundle of optical fibers 6, preferably disposed to form a sheet, is then threaded, at one of its ends through a passage, e.g. the passage 20A in end fitting 2. It is then deposited on top of the strip 5 by being wound helically, as shown in FIG. 4. The other end of the bundle of optical fibers is then threaded through the other passage, i.e. the passage 3A in end fitting 3.

Figure 5:
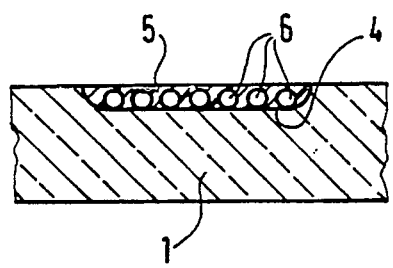
FIG. 5 is a diagrammatic view of the portion of tube shown in FIG. 4, showing the optical waveguide embedded in the elastomer material.
Figure 6:
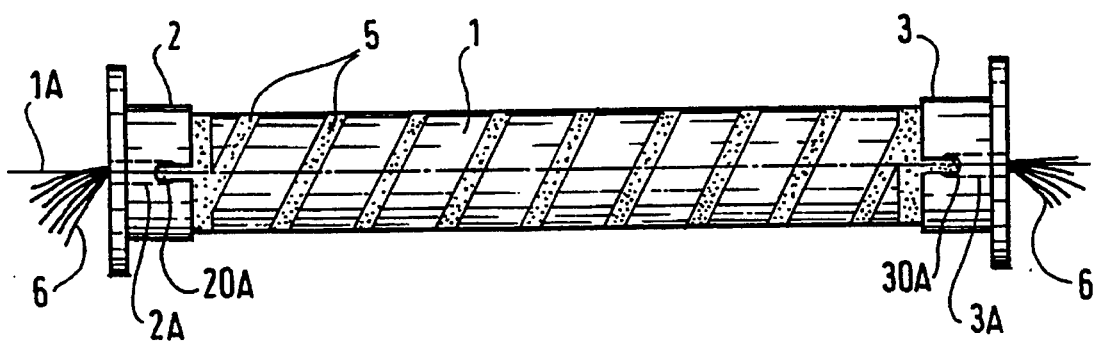
FIG. 6 is a diagrammatic view of the tube shown in FIG. 2, once the optical waveguide has been embedded in the elastomer material.

The optical fibers 6 are then embedded in the strip 5 by applying pressure to the assembly comprising the optical fibers and the strip by means of a pressure wheel which rolls along the grooves 4A, 4B, and 4C. The pressure exerted by the wheel on the tube is optionally adjustable. In this way, the optical fibers 6 are pressed against the bottom of the groove 4 (actually 4A, 4B, and 4C) which is completely filled with elastomer material 5 as shown in FIG. 5, so as to obtain a uniform outside surface for the tube 1. FIG. 6 shows the outside appearance of the tube after the rolling operation, with the optical fibers 6 passing out through the end fittings 2 and 3 at either end of the tube. It should be noted that, if the lathe on which the tube 1 is mounted rotates the tube about its own axis 1A, it is advantageous to perform simultaneously both the step of depositing the optical fibers 6 on the strip 5 (by winding) and the step of applying pressure to the optical fibers and to the strip, so as to reduce the time needed to manufacture the insulator.

The laminated tube 1 equipped with the optical fibers 6, as shown in FIG. 6, is then covered with a vulcanized elastomer material, such as an ethylene-propylene rubber or a silicone, as described in Patent Application FR-2363170 so as to form a plurality of insulating fins 7 around the tube 1, thereby obtaining the electrical insulator shown in FIG. 7. In particular, the fins are made from a continuous strip of elastomer material which is obtained by extrusion, and which has a cross-section in the form of an inverted T. The short transition of the optical fibers from the tube (actually from a groove) to an end fitting (actually through a passage such as 2A or 3A) is covered by the strip of elastomer material that constitutes the insulating fins.

In the above-described method, the winding pitch of the groove may vary along the tube without hindering installation of the optical fibers in the groove and in the end fittings. Moreover, the various stages in the manufacture of the electrical insulator are clearly dissociated from one another, thereby simplifying implementation of the method. It is to be understood that, once the strip 6 has been pressed down, the outside surface of the tube is uniform, so that the strip constituting the insulating fins adheres properly to the laminated tube.

We claim:

1. An electrical insulator including a support element having an outside wall extending along a longitudinal axis between two ends, two end fittings secured to respective ends of the support element on bearing surfaces formed in the outside wall thereof, and an optical waveguide installed inside the insulator so as to extend from one end of said insulator to the other end thereof, and so as to pass through the two end fittings, wherein said optical waveguide is received firstly in two circular grooves formed in the outside wall of the support element and being parts of the respective bearing surfaces for receiving the end fittings, and secondly in a helical groove formed in the outside wall of the support element and having ends that open out respectively into the circular grooves.

2. An insulator according to claim 1, in which the support element is surrounded by a covering of elastomer material constituting a plurality of annular fins, said grooves formed in the outside wall of the support element are filled with said elastomer material, and said optical waveguide is embedded in said elastomer material which fills said grooves.

3. An insulator according to claim 1, in which said helical groove winds around the longitudinal axis at a pitch that varies along said axis.

4. A method of manufacturing an electrical insulator including a support element having an outside wall extending along a longitudinal axis between two ends, two end fittings secured to respective ends of the support element on bearing surfaces formed in the outside wall thereof, in which method at least one optical waveguide is installed inside the insulator so as to extend from one end of said insulator to the other end thereof, and so as to pass through the two end fittings;

said method comprising the following steps:

machining the support element so as to form a helical groove in the outside wall thereof, which groove winds helically about said longitudinal axis;

installing a continuous extruded strip of elastomer material in and along said helical groove;

depositing the optical waveguide on top of the strip and along said helical groove; and exerting pressure on the top of the strip so as to press the optical waveguide against the bottom of said helical groove, and so as to embed said waveguide in the elastomer material.

5. A method according to claim 4, further including a step consisting in machining the support element so as to form two end-fitting receiving bearing surfaces in the outside wall of the support element so that, once the end fittings have been secured to said bearing surfaces, two circular grooves are obtained that extend about said longitudinal axis, each circular groove being placed in the vicinity of the edge of an end fitting.

6. A method according to claim 4, in which the step of depositing the optical waveguide on top of the strip of elastomer material, and the step in which pressure is exerted on the top of the strip are performed simultaneously.

7. A method according to claim 6, in which the support element is rotated about said longitudinal axis during both the step of depositing said strip of elastomer and also the step in which pressure is exerted on the top of the strip.

* * * * *